US006842631B1

(12) United States Patent
Allen et al.

(10) Patent No.: US 6,842,631 B1
(45) Date of Patent: Jan. 11, 2005

(54) REDUCED-LAYER ISOLATED PLANAR BEAMFORMER

(75) Inventors: Steven Michael Allen, Marlton, NJ (US); Michael Gribbons, Mt. Laurel, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 441 days.

(21) Appl. No.: 10/120,913

(22) Filed: Apr. 11, 2002

(51) Int. Cl.[7] .................................................. H04M 1/00

(52) U.S. Cl. .................... 455/562.1; 455/561; 343/700; 343/853; 342/368; 342/373

(58) Field of Search .............................. 455/561, 562.1, 455/853, 333; 342/368–373; 343/757, 700; 333/116, 128, 238, 246

(56) References Cited

U.S. PATENT DOCUMENTS 4,375,053 A * 2/1983 Viola et al. ................. 333/116
5,001,492 A * 3/1991 Shapiro et al. ...... 343/700 MS
5,017,927 A 5/1991 Agrawal et al. ............ 342/371
5,274,386 A 12/1993 Pellon ......................... 342/380
5,274,839 A 12/1993 Kularajah et al. ......... 455/12.1
5,333,001 A 7/1994 Profera, Jr. ................. 342/373
5,592,179 A 1/1997 Windyka .................... 342/372
6,014,372 A 1/2000 Kent et al. .................. 370/316
6,084,545 A 7/2000 Lier et al. ................... 342/360
6,087,974 A 7/2000 Yu .............................. 342/62
6,239,762 B1 5/2001 Lier ........................... 343/770
6,512,934 B2 * 1/2003 Ihara et al. .............. 455/562.1

* cited by examiner

*Primary Examiner*—Quochien B. Vuong
*Assistant Examiner*—Nhan T. Le
(74) *Attorney, Agent, or Firm*—Duane Morris LLP

(57) ABSTRACT

A planar beamformer (700) for use with a array antenna includes a dielectric sheet (210) defining first (210*us*) and second (2101*s*) broad sides. A strip conductor (32*b*) on the first side crosses over a similar strip conductor (32*c*) on the second side. In order to reduce coupling between the conductors in a stripline or microstrip context, a set of stripline- (or microstrip)-to-coplanar-waveguide transitions are incorporated into each strip conductor adjacent the crossover, and the crossover region conductors are narrowed. The transitions include petal elements coplanar with the strip conductors.

6 Claims, 5 Drawing Sheets

REDUCED-LAYER ISOLATED PLANAR BEAMFORMER

FIELD OF THE INVENTION

This invention relates to beamformers for array antennas, and more particularly to such beamformers in planar form.

BACKGROUND OF THE INVENTION

Antenna systems are widely used for communications, radar, entertainment, and sensing uses. Many such antenna systems are in the forms of arras of elemental antennas, which are operated in a corporate or common fashion, to thereby achieve performance different from that which can be achieved with individual antenna elements, or for generating plural simultaneous antenna beams. The art of corporate beamformers is well advanced, and such beamformers are described in U.S. Pat. No. 5,025,485, issued Jun. 18, 1991 in the name of Csongor et al.; U.S. Pat. No. 5,017,927 issued May 21, 1991 in the name of Agrawal et al.; U.S. Pat. No. 5,274,386, issued Dec. 28, 1993 in the name of Pellon; U.S. Pat. No. 5,333,001 issued Jul. 26, 1994 in the name of Profera; U.S. Pat. No. 5,592,179, issued Jan. 7, 1997 in the name of Windyka; U.S. Pat. No. 6,014,372, issued Jan. 11, 2000 in the name of Kent et al.; U.S. Pat. No. 6,084,545, issued Jul. 4, 2000 in the name of Lier et al.; U.S. Pat. No. 6,087,974 issued Jul. 11, 2000 in the name of Yu; and U.S. Pat. No. 6,239,762, issued May 29, 2001 in the name of Lier.

Beamforming has in the past often been provided by complex three-dimensional hollow waveguide structures. However, such hollow waveguide structures are heavy, costly, and have limited bandwidth. In addition, waveguide structures require special treatment in order to provide the "crossovers" which may be required in some systems to achieve the correct phasing of the antennas of an array, as described in U.S. Pat. No. 5,274,839, issued Dec. 28, 1993 in the name of Kularajah et al.

Printed-circuit corporate beamformers are known for use with array antennas, but suffer from reduced power-handling capability relative to hollow-waveguide beamformers. However, by comparison with hollow-waveguide beamformers, printed-circuit beamformers are very inexpensive.

Improved beamformers are desired.

SUMMARY OF THE INVENTION

A beamformer according to an aspect of the invention comprises a sheet of dielectric material defining first and second broad surfaces, a first strip conductor extending on the first broad side of the sheet of dielectric and across or past a crossover region, and a second strip conductor extending on the second broad side of the sheet of dielectric and across the crossover region. The passage of both strip conductors through the crossover region undesirably tends to couple the strip conductors. A first transition to coplanar waveguide is located in-line with the first strip conductor, and on the first broad side of the sheet of dielectric and on one side of the crossover region. A second transition to coplanar waveguide is located in-line with the first strip conductor, on the first broad side of the sheet of dielectric and on another side of the crossover region, for coacting with the first transition to coplanar waveguide so that the first strip conductor, in the crossover region, is part of a first coplanar waveguide. In addition, a third transition to coplanar waveguide is located in-line with the second strip conductor, on the second broad side of the sheet of dielectric and on one side of the crossover region, and a fourth transition to coplanar waveguide is located in-line with the second strip conductor, on the second broad side of the sheet of dielectric and on another side of the crossover region, for coacting with the third transition to coplanar waveguide so that the second strip conductor, in the crossover region, is part of a second coplanar waveguide. As a result, the first and second coplanar waveguides lie in different planes in the crossover region and tend to be isolated from each other. In a particular embodiment of the beamformer, first and second ground planes are spaced away from the first and second broad sides of the sheet of dielectric, respectively, for coacting with the first and second strip conductors to define strip transmission line structures at least at some locations remote from the crossover region.

In this embodiment, the first transition to coplanar waveguide, which is located on the first broad side of the sheet of dielectric, and on one side of the crossover region, includes first and second planar conductors lying on the first broad surface of the sheet of dielectric in the crossover region, and adjacent each edge of the first strip conductor, and the second transition to coplanar waveguide located on the first broad side of the sheet of dielectric, and on the other side of the crossover region, comprises third and fourth planar conductors lying on the first broad surface of the sheet of dielectric in the crossover region, and adjacent each edge of the first strip conductor.

In a preferred version of this embodiment, the third transition to coplanar waveguide located on the second broad side of the sheet of dielectric, and on one side of the crossover region, comprises first and second planar conductors lying on the second broad surface of the sheet of dielectric in the crossover region, and adjacent each edge of the second strip conductor, and the fourth transition to coplanar waveguide located on the second broad side of the sheet of dielectric, and on the other side of the crossover region, comprises third and fourth planar conductors lying on the second broad surface of the sheet of dielectric in the crossover region, and adjacent each edge of the second strip conductor.

A most preferred version of this embodiment further includes conductive means interconnecting the first and second ground planes with the first, second, third, and fourth planar conductors lying on the first and second broad surfaces of the sheet of dielectric, to thereby tend to maintain the first and second ground planes, and the first, second, third, and fourth planar conductors lying on the first and second broad surfaces of the sheet of dielectric, at a common electrical potential.

According to another aspect of the invention, a corporate beamformer is for, in one direction of operation, receiving signals to be transmitted at first and second ports, and for distributing the signals among at least third, fourth, fifth, and sixth ports, and for, in the other direction of operation, receiving signals at the third, fourth, fifth, and sixth ports, and combining the signals for generation of combined signals at the first and second ports. The corporate beamformer according to this other aspect of the invention includes a planar structure including a first layer of dielectric material defining first and second broad sides, and a planar first 3 dB hybrid coupler (also known simply as "coupler" or "hybrid") lying on the first broad side of the first layer of dielectric material. The first 3 dB hybrid coupler defines common, second and third ports, the common port of the first 3 dB hybrid coupler defining, or corresponding to, the first port of the corporate beamformer. A planar second 3 dB hybrid coupler lies on the second broad side of the first layer of dielectric material. The second 3 dB hybrid coupler defines common, second and third ports. The common port of the second 3 dB hybrid coupler defines, or corresponds to, the second port of the corporate beamformer. A first strip conductor lies on the first broad side of the first layer of dielectric material, and this first strip conductor is coupled at one end to the third port, and also coupled at a second end to a first output port of said first 3 dB hybrid coupler. A second strip conductor lies on the second broad side of the first layer of dielectric material. The second strip conductor is coupled at one end to the second port of the second 3 dB hybrid coupler, and coupled at a second end to the sixth port of the corporate beamformer. A third strip conductor lies on the first broad side of the first layer of dielectric material, and extends from the second port of the first 3 dB hybrid coupler to the fifth port of the corporate beamformer by way of a crossover. The third strip conductor is narrowed in the region of the crossover. A fourth strip conductor lies on the second broad side of the first layer of dielectric material, and extends from the first port of the second 3 dB hybrid coupler to the fourth port of the corporate beamformer by way of the crossover. The fourth strip conductor is narrowed in the region of the crossover. The third and fourth strip conductors overlie each other in the crossover region, and cross at right angles as seen looking in a direction orthogonal to the plane of the first layer of dielectric material. First, second, third, and fourth coplanar conductors lie on the first broad side of the first layer of dielectric, and each of the coplanar conductors includes a tapered portion extending toward and into the crossover region. Fifth, sixth, seventh, and eighth coplanar conductors lie on the second broad side of the first layer of dielectric. Each of the fifth, sixth, seventh, and eighth coplanar conductors includes a tapered portion extending toward and into the crossover region. An interconnection arrangement is coupled to the first, second, third, fourth, fifth, sixth, seventh, and eighth coplanar conductors, for tending to maintain the first, second, third, fourth, fifth, sixth, seventh, and eighth coplanar conductors at a common potential. Ideally, this common potential is a ground potential, and the ground potential is provided by additional conductors extending through the structure and terminating on the coplanar conductors and on a ground plane.

A corporate beamformer according to a specific aspect of the invention further includes first and second ground planes spaced apart from the first and second strip conductors and from the first, second, third, fourth, fifth, sixth, seventh, and eighth coplanar conductors, for tending to constrain the fields surrounding the first and second strip conductors. This specific aspect of the invention preferably includes through-layer conductors connecting the first and second ground planes to the first, second, third, fourth, fifth, sixth, seventh, and eighth coplanar conductors.

DESCRIPTION OF THE INVENTION

Figure 1:
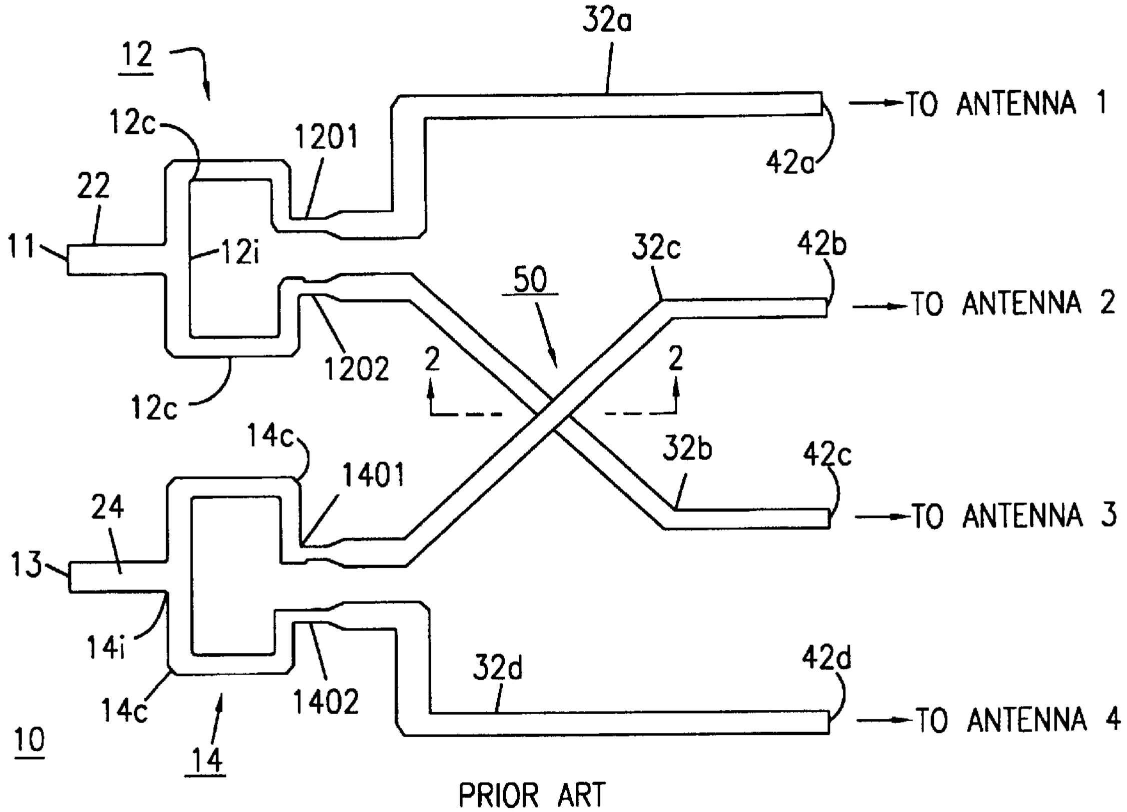
PRIOR ART FIG. 1
FIG. 1 is a simplified plan view of a portion of a beamformer for an antenna array, including a conductor crossover.

FIG. 1 is a simplified plan view of a portion 10 of a beamformer for an antenna array. The structures in FIG. 1 represent the conductors defined or formed on various surfaces of a dielectric sheet or sheets. As illustrated in FIG. 1, portion 10 includes the electrical conductors 12*c* of a first Wilkinson 3 dB power splitter or combiner and the conductors 14*c* of a second Wilkinson 3 dB power splitter or combiner, well known in the art as a form of 3 dB hybrid coupler. A strip conductor 22 extends from a first input port 11 of the structure 10 to an "input" port 12*i* of 3 dB hybrid coupler 12, and a further strip conductor 24 extends from a second input port 13 of structure 10 to an "input" port 14*i* of 3 dB hybrid coupler 14. When signal flows from port 11 to 3 dB hybrid coupler 12, the power is ideally divided into two portions of equal magnitude, or half-power each, and the divided or reduced signal power appears at the "output" ports 12*o*1 and 12*o*2 of 3 dB hybrid coupler 12. Similarly, when signal flows from port 13 to 3 dB hybrid coupler 14, the power is ideally divided into two portions of equal magnitude, and the divided or reduced signal power appears at the "output" ports 14*o*1 and 14*o*2 of 3 dB hybrid coupler 14. Those skilled in the art also know that when signal power is applied to the "output" ports of a 3 dB hybrid coupler, the signal will appear at the common port, with an amplitude which depends upon the phase relationship between the two signals so applied.

The structure of FIG. 1 also includes a further strip conductor 32*a* extending from "output" port 12*o*1 of 3 dB hybrid coupler 12 to an "output" port 42*a* of beamformer portion 10. Output port 42*a* is conventionally configured to be coupled to an elemental antenna of an antenna array. Similarly, a strip conductor 32*d* extends from "output" port 14*o*2 of 3 dB hybrid coupler 14 to an "output" port 42*d* of beamformer portion 10. Output port 42*d* is for coupling to an elemental antenna of the antenna array. In addition, further strip conductors 32*b* and 32*c* extend from ports 12*o*2 and 14*o*1, respectively, to "output" ports 42*c* and 42*b*, respectively. As illustrated in FIG. 1, the ordering of ports 42*b* and 42*c* is "reversed," with the result that strip conductors 32*b* and 32*c* must cross each other, which crossing occurs in a crossover region designated 50.

Since the signals carried by strip conductors 32*b* and 32*c* originate from different input ports of beamformer portion 10, the signals on these conductors may be different, and thus not susceptible of being combined. Consequently, conductors 32*b* and 32*c* must be kept separate from each other in the crossover region. Thus, conductors 32*b* and 32*c* must lie in different planes of the structure of beamformer portion 10.

Figure 2:
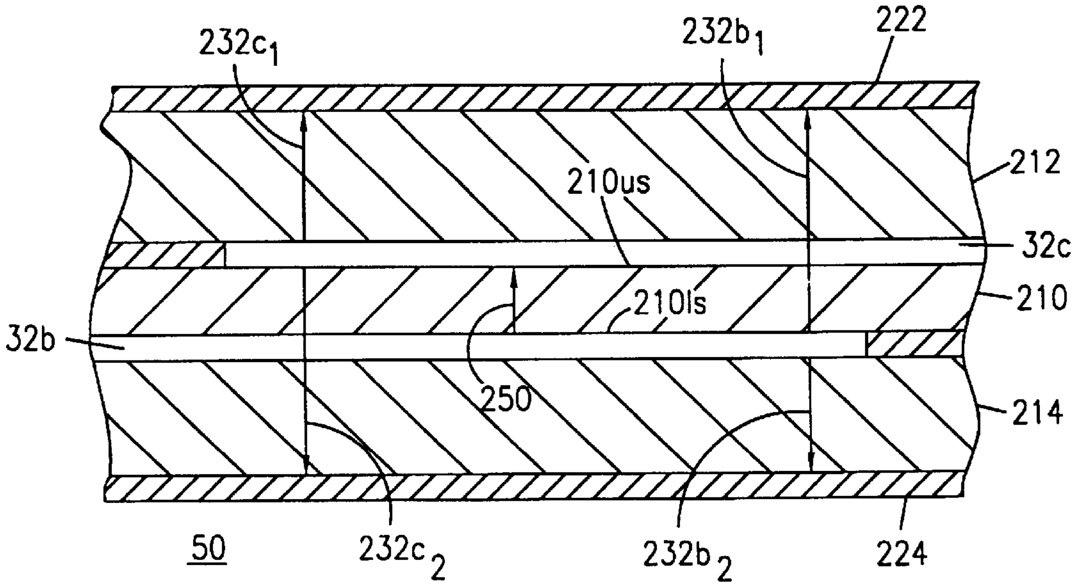
PRIOR ART FIG. 2
FIG. 2 is a simplified cross-section of one possible structure by which the crossover arrangement of FIG. 1 might be implemented, which has undesired mutual coupling.

FIG. 2 is a simplified cross-section of one possible structure by which the crossover 50 arrangement of FIG. 1 might be implemented. In FIG. 2, the crossover region 50 is illustrated as including a central dielectric sheet or layer 210, defining a broad upper surface 210*us* and a broad lower surface 2101*s*. Strip conductor 32*c* lies on, or is supported by, upper surface 210*us*, and strip conductor 32*b* is similarly supported by overlying lower surface 2101*s*. An additional dielectric layer 212 overlies conductor 32*c* and that portion of upper surface 210*us* of dielectric sheet 210 which is not covered by strip conductor 32*c*. A conductive ground plane 222 overlies dielectric layer 212. Similarly, an additional dielectric layer 214 lies under conductor 32*b* and that portion of lower surface 2101*s* of dielectric sheet 210 which is not covered by strip conductor 32*b*. A conductive ground plane 224 underlies dielectric layer 214. Those skilled in the art will recognize the layered structure of FIG. 2 as defining a "microstrip" transmission-line structure, which tends to maintain relatively constant or controlled impedance of the transmission paths by which signals are coupled from one location to another. In general, the electric fields associated with flow of signals on either strip conductor 32*b* or 32*c* may be represented by "arrows" having their "tails" originating on the strip conductors 32*b* and 32*c*, and their "heads" terminating on the ground planes 222 and 224. In FIG. 2, the arrows $232c_1$ and $232c_2$ have their "tails" originating on conductor 32*c* and their "heads" terminating on ground planes 222 and 224, respectively. Similarly, the arrows $232b_1$ and $232b_2$ have their "tails" terminating on strip conductor 32*b* and their "heads" terminating on ground planes 222 and 224, respectively. Precisely in the center of the crossover region, however, the arrows representing the electric fields associated with conductors 32*b* and 32*c* will terminate on each other, as suggested by arrow 250, as well as on the ground planes. The existence of this field line structure represents coupling between the strip conductors, which should be independent. The coupling in the crossover region is a defect.

One way to reduce the coupling between strip conductors in a crossover region of a structure is to make the width of the conductors very small, to thereby reduce the plate area of the equivalent capacitors, and to increase the distance between the strip conductors to thereby increase the inter-element spacing of the equivalent capacitor, and further to reduce the dielectric constant of the intermediary dielectric material. Unfortunately, reducing the capacitance also has the effect of increasing the surge or characteristic impedance of the transmission lines, which introduces other problems.

Figure 3:
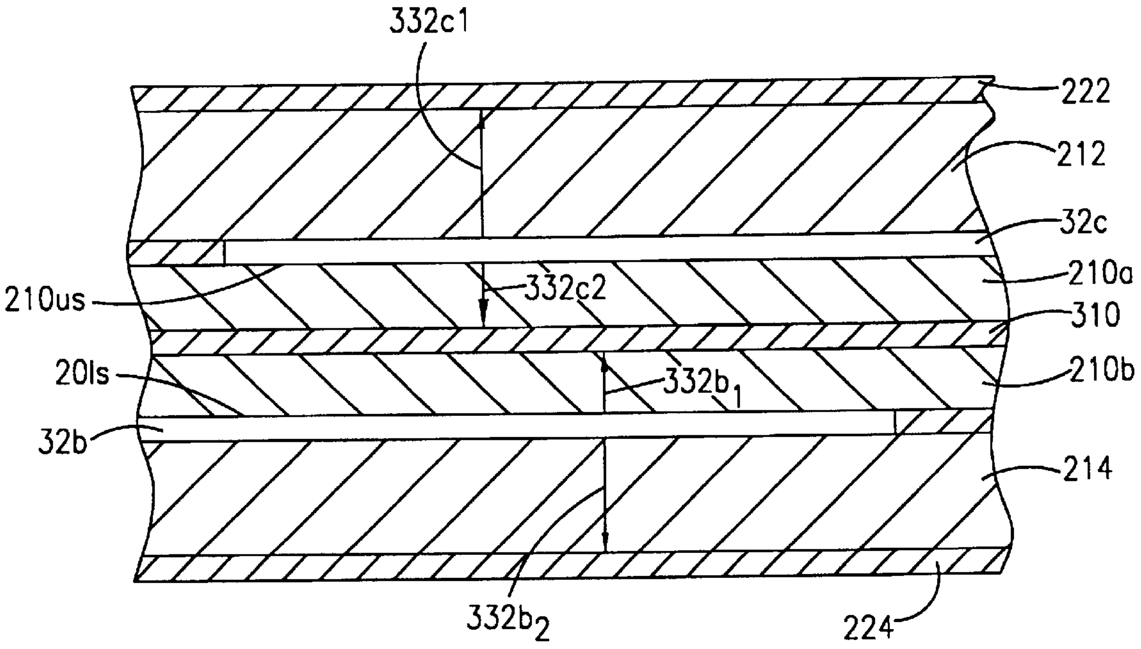
PRIOR ART FIG. 3
FIG. 3 illustrates a conventional prior-art response to the mutual coupling of the structure of FIG. 2.

The structure of the cross-section of FIG. 3 illustrates a conventional prior-art response to the problem of mutual coupling as described in conjunction with FIG. 2. In FIG. 3, elements corresponding to those of FIG. 2 are designated by like reference numerals. In FIG. 3, dielectric layer or sheet 210 has been divided horizontally into an upper portion 210*a* and a lower portion 210*b*, and a further conductive layer 310 has been interposed between the divided halves 210*a* and 210*b*, to act as a further ground plane isolating strip conductors 32*b* and 32*c*. With the interposition of further ground plane 310, upper strip conductor 32*c* is isolated between ground planes 222 and 310, and lower strip conductor 32*b* is isolated between ground planes 224 and 310. Consequently, the arrows representing the electric field structure associated with strip conductor 32*c*, and illustrated as $332c_1$ and $332c_2$, terminate only on ground planes 222 and 310, and never cross over to the lower half of the structure so as to interact with strip conductor 32*b*. Similarly, the arrows representing the electric field structure associated with strip conductor 32*b*, and illustrated as $332b_1$ and $332b_2$, terminate only on ground planes 224 and 310, and never cross over to the upper half of the structure so as to interact with strip conductor 32*c*.

This arrangement provides excellent isolation. However, it will be noted that the number of layers has increased in order to obtain this isolation, from seven layers (both metal and dielectric) in FIG. 2 to nine layers in FIG. 3. The increased number of layers increases the cost of the printed-circuit board structures which form the basis for a beamformer.

According to an aspect of the invention, the isolation between strip conductor pairs in a crossover region is improved or increased, without increasing the number of layers of the planar structure. More particularly, microstrip- or stripline-to-coplanar transitions are introduced into each strip transmission path adjacent the crossover region, so that the field structure is modified in the region of the crossover, in a fashion which reduces the interaction or coupling between the crossing strip conductors.

Figure 4:
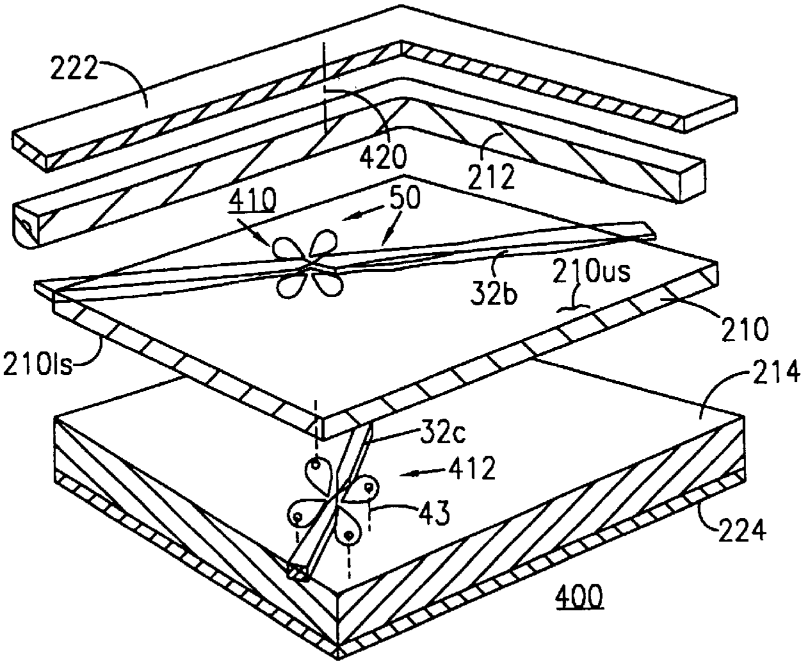
FIG. 4 is a simplified, exploded, perspective or isometric view of a portion of a beamformer in a crossover region, illustrating a conductor layout which includes microstrip-to-coplanar or stripline-to-coplanar transitions as an aid to reducing mutual coupling between strip conductors.

FIG. 4 is a simplified, exploded, perspective or isometric view of a portion 400 of a beamformer in the crossover region, partially cut away to illustrate details, and illustrating a seven-layer structure, and a conductor layout which includes microstrip-to-coplanar or stripline-to-coplanar transitions in the crossover region according to an aspect of the invention. In FIG. 4, elements corresponding to those of FIGS. 1 and 2 are designated by like reference numerals. The structure of FIG. 4 is similar to that of FIG. 2, with the exception that a pair of stripline-to-coplanar-waveguide transitions are associated with each strip transmission line or conductor. More particularly, the stripline-to-coplanar-waveguide transitions associated with strip conductor 32*b* are designated generally as 410, and the stripline-to-coplanar-waveguide transitions associated with strip conductor 32*c* are designated generally as 412. The conductive elements of the stripline-to-coplanar transitions are grounded to the ground conductors 222 and 224, as suggested by representative conductors designated 420 and 430. They are also interconnected to each other to tend to equalize their electric potentials (to keep them at or near ground voltage).

Figure 5A:
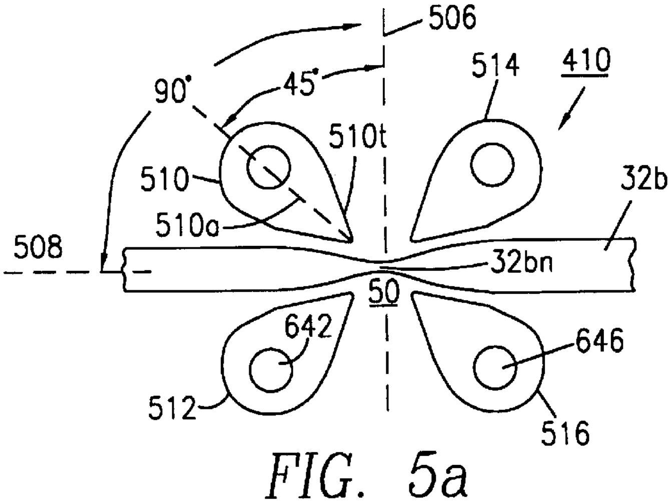
FIG. 5*a* is a plan view of the strip conductor layout of one layer of the structure of FIG. 4, showing details of the transitions to coplanar transmission line.

FIG. 5*a* is a plan view of stripline-to-coplanar-waveguide transitions 410, and their relationship with strip conductor 32*b*. In FIG. 5*a*, conductor 32*b* has a narrowing or neck 32*bn* in a central region 50 where the crossover proper occurs. The purpose of the narrowing or neck 32*bn* is to reduce the surface area of the conductors in the crossover region, to minimize capacitance to the other, crossing conductor (32*c* of FIG. 4). An axis 508 defines the direction of elongation of conductor 32*b*. A further line 506 lies orthogonal to, or at 90° relative to, the axis 508. Line 506 can be viewed as passing through the center the crossover in region 50. Four "petals" 510, 512, 514, and 516 are planar conductors, electrically isolated in the illustrated region from strip conductor 32*b*. Each petal includes a generally tapered portion about a central axis, such as portion 510*t* about axis 510*a*, projecting toward central region 50, but not extending as far as the center. The axis of each petal 510, 512, 514, and 516 make equal angles with the longitudinal or elongation axis 508 and orthogonal line 506. More particularly, axis

510*a* lies at equal angles, namely 45°, from axis of elongation 508 and orthogonal line 506. Consequently, the structure of FIG. 5*a* is symmetric about line 506. The petals 510, 512, 514, and 516 may be viewed as being organized into pairs. That is, a pair is defined by those petals which lie adjacent to the edges of the strip conductor and are symmetrically disposed about the longitudinal axis of the strip conductor. With this definition, pair 510, 512 is an "input" pair, viewing signal transmission as being from left to right in FIG. 5*a*, and pair 514, 516 is an "output" pair.

Figure 5B:
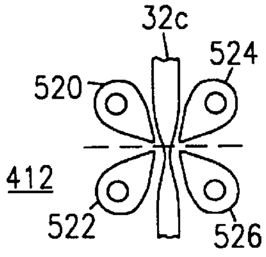
FIG. 5*b* is a similar plan view of the strip conductor of another layer of the structure of FIG. 4, looking through the dielectric.
Figure 6A:
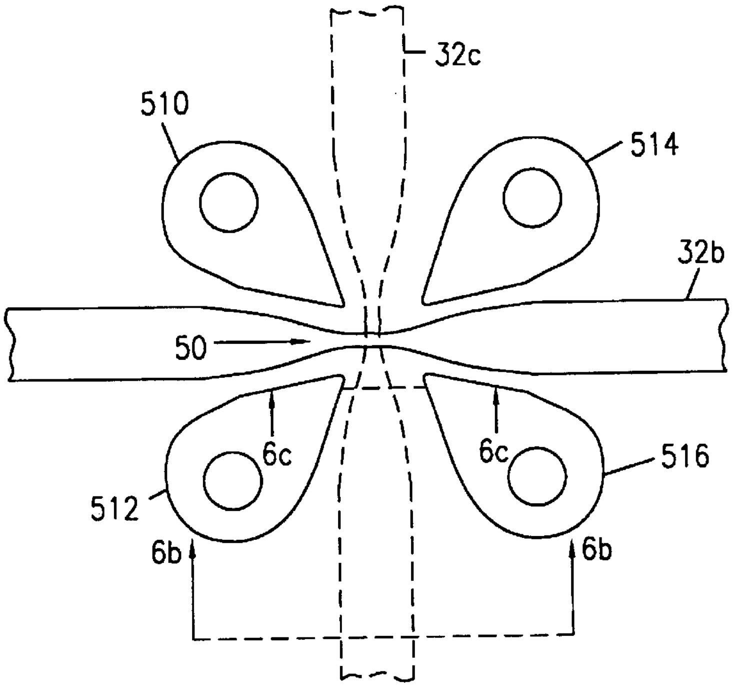
FIG. 6*a* is a plan view illustrating both layers of conductor, superposed on one another, to illustrate the symmetry of the transitions.

FIG. 5*b* is a plan illustration of strip conductor 32*c* of FIG. 4, together with the petals of its stripline-to-coplanar-waveguide transition, looking "through" dielectric layer 210. The structure of FIG. 5*b* is similar to that of FIG. 5*a*, except that the strip conductor 32*c* is oriented vertically, and the petals are designated 520, 522, 524, and 526. The petals of FIG. 5*b* may also be viewed as being organized into input and output pairs, with the pairs being 520, 524; 522, 526. FIG. 6*a* illustrates the superposition of strip conductors 32*b* and 32*c* of FIG. 4, and the associated petals, with dielectric layer or sheet 210 separating them. As illustrated in FIG. 6*a*, only petals 510, 512, 514, and 516 are visible on the obverse side of layer 210, as the other set of petals 520, 522, 524, and 526 lies directly underneath petals 510, 512, 514, and 516, respectively, which conceal them from view. Strip conductor 32*c*, being on the reverse side of dielectric layer 210, is illustrated in phantom.

Figure 6B:
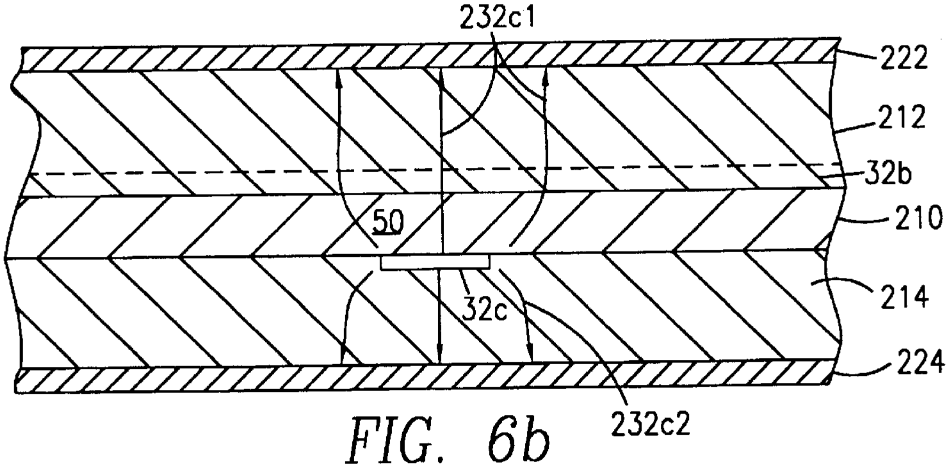
FIG. 6*b* is a cross-sectional view of the structure of FIG. 6*a* taken at section lines 6*b*—6*b*, showing the stripline electric field structure.

FIG. 6*b* is a simplified cross-sectional view of the structure of FIG. 6*a*, looking in the direction of section lines 6*b*—6*b*. In FIG. 6*b*, elements corresponding to those of FIGS. 1, 2, 4, 5*a*, and 5*b* are designated by like reference numerals. The electric field structure represented by field lines 231*c*1 and 232*c*1 of FIG. 6*b* represents a stripline field structure. As illustrated, field lines 232*c*1 originate at strip conductor 32*c* and extend to upper ground plane or conductor 222, and field lines 232*c*2 originate at strip conductor 32*c* and extend to lower ground plane 224.

Figure 6C:
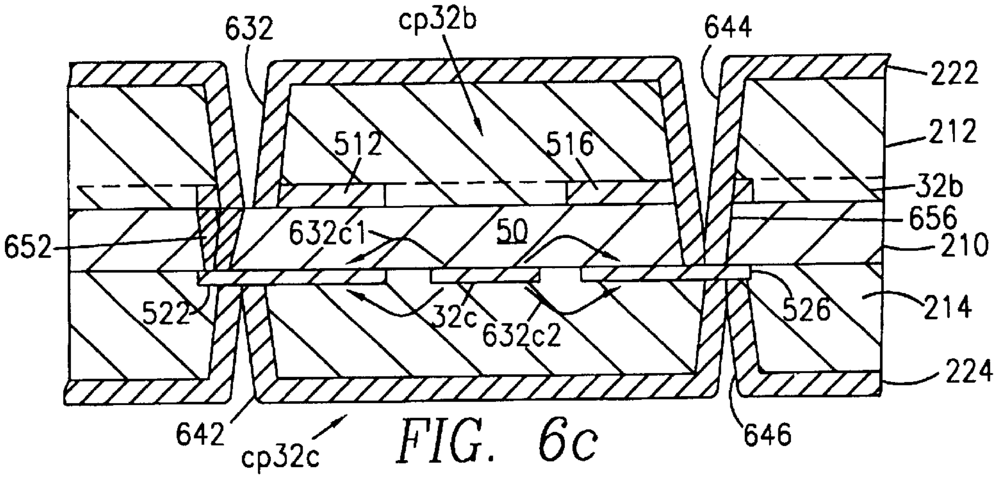
FIG. 6*c* is a cross-sectional view of the structure of FIG. 6*a* taken at section lines 6*c*—6*c*, showing the coplanar transmission line field structure.
Figure 7:
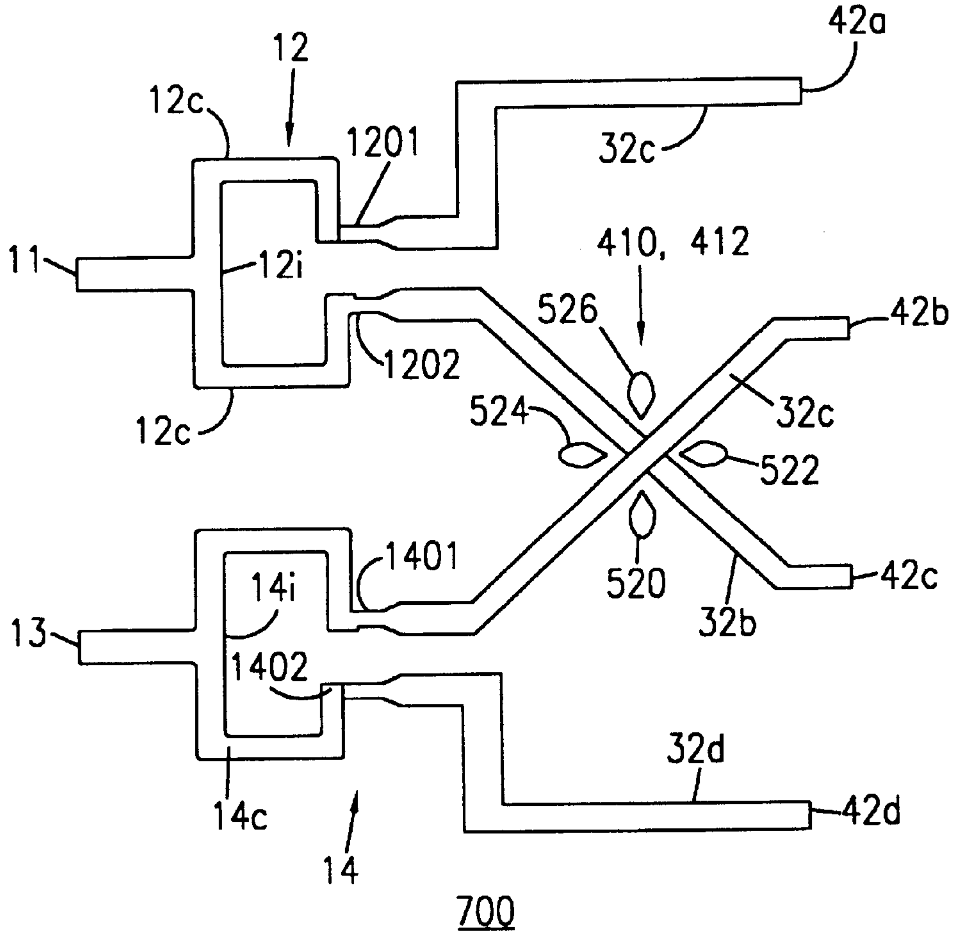
FIG. 7 is a view similar to that of FIG. 1, including elements illustrated in FIG. 5*b*.

FIG. 6*c* is a simplified cross-sectional view of the structure of FIG. 6*a*, looking in the direction of section lines 6*c*—6*c*. FIG. 6*c* illustrates the through-via connections which ground the petals of the stripline-to-coplanar-line transitions. More particularly, FIG. 6*c* illustrates through vias 632 and 636 which connect ground plane or conductor 222 to petals 512 and 516, respectively. Also, through vias 642 and 646 interconnect ground plane or conductor 224 to petals 522 and 526, respectively. Finally, through vias 652 and 656 interconnect petals 512 with 522 and 516 with 526, respectively. These connections tend to maintain the petals at ground potential. The coplanar electric field structure associated with strip conductor 32*c* in the crossover region is illustrated by lines 632*c*1 and 632*c*2, originating on strip conductor 32*c* and extending to the right and the left to the near edges of petals 522 and 526, respectively.

Those skilled in the art will understand that the electric field structure illustrated in FIG. 6*c* will tend to couple to strip conductor 32*b* much less than the field structure of FIG. 6*b*. Consequently, the interposition of the stripline-to-coplanar-waveguide transitions has the effect of improving isolation between strip conductors 32*b* and 32*c* in the crossover region 50. Nevertheless, the structure requires no more layers than the prior-art structure of FIG. 2, and should in principle cost no more.

In one application of a beamformer according to an aspect of the invention, in which two "input" ports are available, one of the input ports is coupled to an arrangement for sum-beam processing, and the other input port is coupled to an arrangement for difference- or squint-beam processing.

Other embodiments of the invention will be apparent to those skilled in the art. For example, while through vias are illustrated and described for providing electrical contact between conductors in different layers, such contacts could be provided by simple through wires, soldered on each side, or by other conductive structures. While the various layers have been described as dielectric, some of these layers may be made from uncured prepreg used to hold together parts of the structure during fabrication, which prepreg is then cured to form the dielectric layer. While the described beamformer has two "input" and four "output" ports, the number of input and output ports is widely and independently variable to meet system requirements.

Thus, a beamformer (700) according to an aspect of the invention comprises a sheet (210) of dielectric material defining first (210*us*) and second (2101*s*) broad surfaces, a first strip conductor (32*b*) extending on the first (210*us*) broad side of the sheet (210) of dielectric and across or past a crossover region (50), and a second strip conductor extending on the second (2101*s*) broad side of the sheet (210) of dielectric and across the crossover region (50). The passage of both strip conductors (32*b*, 32*c*) through the crossover region (50) undesirably tends to couple the strip conductors. A first transition to coplanar waveguide (510, 512) is located in-line with the first strip conductor (32*b*), and on the first (210*us*) broad side of the sheet (210) of dielectric and on one side of the crossover region (50). A second transition to coplanar waveguide (514, 516) is located in-line with the first strip conductor (32*b*), on the first (210*us*) broad side of the sheet (210) of dielectric and on another side of the crossover region (50), for coacting with the first transition to coplanar waveguide so that the first strip conductor (32*b*), in the crossover region (50), is part of a first coplanar waveguide (cp32*b*). In addition, a third transition to coplanar waveguide (520, 524) is located in-line with the second (32*c*) strip conductor, on the second (2101*s*) broad side of the sheet (210) of dielectric and on one side of the crossover region (50), and a fourth transition to coplanar waveguide (522, 526) is located in-line with the second strip conductor (32*c*), on the second (2101*s*) broad side of the sheet (210) of dielectric and on another side of the crossover region (50), for coacting with the third transition (520, 524) to coplanar waveguide so that the second strip conductor (32*c*), in the crossover region (50), is part of a second coplanar waveguide (cp32). As a result, the first (cp32*b*) and second (cp32*c*) coplanar waveguides lie in different planes in the crossover region (50) and tend to be isolated from each other. In a particular embodiment of the beamformer (700), first (222) and second (224) ground planes are spaced away from the first (210*us*) and second (2101*s*) broad sides of the sheet (210) of dielectric, respectively, for coacting with the first (32*b*) and second (32*c*) strip conductors to define strip transmission line structures at least at some locations (FIG. 6*b*) remote from the crossover region (50).

In this embodiment, the first transition (510, 512) to coplanar waveguide, which is located in-line with the first strip conductor (32*b*) on the first (210*us*) broad side of the sheet (210) of dielectric, and on one side of the crossover region (50), includes first (510) and second (512) planar conductors lying on the first broad surface (210*us*) of the sheet (210) of dielectric in the crossover region (50), and adjacent each edge of the first strip conductor (32*b*). In this context, the term "adjacent each edge" refers to one of the planar conductors being adjacent one edge of the strip conductor, and the other one of the planar conductors being adjacent the other edge of the strip conductor. In this embodiment, the second transition to coplanar waveguide located on the first (210*us*) broad side of the sheet (210) of dielectric, and on the other side of the crossover region (50), comprises third (514) and fourth (516) planar conductors lying on the first (210*us*) broad surface of the sheet (210) of dielectric in the crossover region (50), and adjacent each edge of the first strip conductor (32*b*).

In a preferred version of this embodiment, the third transition to coplanar waveguide located on the second (2101*s*) broad side of the sheet (210) of dielectric, and on one side of the crossover region (50), comprises first (520) and second (524) planar conductors lying on the second (2101*s*) broad surface of the sheet (210) of dielectric in the crossover region (50), and adjacent each edge of the second strip conductor (32*c*), and the fourth transition to coplanar waveguide located on the second (2101*s*) broad side of the sheet (210) of dielectric, and on the other side of the crossover region (50), comprises third (522) and fourth (526) planar conductors lying on the second (2101*s*) broad surface of the sheet (210) of dielectric in the crossover region (50), and adjacent each edge of the second strip conductor.

A most preferred version of this embodiment further includes conductive means (632, 642, 644, 646, 652, 656) interconnecting the first (222) and second (224) ground planes with the first (510, 520), second (512, 524), third (514, 522), and fourth (516, 526) planar conductors lying on the first (210*us*) and second (2101*s*) broad surfaces of the sheet (210) of dielectric, to thereby tend to maintain the first (222) and second (224) ground planes, and the first (510, 520), second (512, 524), third (514, 522), and fourth (516, 526) planar conductors lying on the first (210*us*) and second (2101*s*) broad surfaces of the sheet (210) of dielectric, at a common electrical potential.

According to another aspect of the invention, a corporate beamformer (700) is for, in one direction of operation, receiving signals to be transmitted at first (11) and second (13) ports, and for distributing the signals among at least third (42*a*), fourth (42*b*), fifth (42*c*), and sixth (42*d*) ports, and for, in the other direction of operation, receiving signals at the third (42*a*), fourth (42*b*), fifth (42*c*), and sixth (42*d*0 ports, and combining the signals for generation of combined signals at the first (11) and second (13) ports. The corporate beamformer (700) according to this other aspect of the invention includes a planar structure including a first layer (210) of dielectric material defining first (210*us*) and second (2101*s*) broad sides, and a planar first 3 dB hybrid coupler (12) lying on the first (210*us*) broad side of the first layer of dielectric material. The first 3 dB hybrid coupler (12) defines common (12*i*), second (12*o*1) and third (1202) ports. The common port (12*i*) of the first 3 dB hybrid coupler (12) defines, or corresponds to, the first port (11) of the corporate beamformer (700). A planar second 3 dB hybrid coupler (14) lies on the second (2101*s*) broad side of the first layer (210) of dielectric material. The second 3 dB hybrid coupler (14) defines common (14*i*), second (1401) and third (1402) ports. The common port (14*i*) of the second 3 dB hybrid coupler (14) defines, or corresponds to, the second port (13) of the corporate beamformer (700). A first strip conductor (32*a*) lies on the first (210*us*) broad side of the first layer (210) of dielectric material, and this first strip conductor (32*a*) is coupled at one end to the third port (42*a*) of the beamformer (700), and is also coupled at a second end to a first output port (1201) of said first 3 dB hybrid coupler (12). A second strip conductor (32*d*) lies on the second (2101*s*) broad side of the first layer (210) of dielectric material. The second strip conductor (32*d*) is coupled at one end to the second port (14*o*2) of the second 3 dB hybrid coupler (14), and coupled at a second end to the sixth port (42*d*) of the corporate beamformer (700). A third strip conductor (32*b*) lies on the first (210*us*) broad side of the first layer (210) of dielectric material, and extends from the second port (12*o*2) of the first 3 dB hybrid coupler (12) to the fifth port (42*c*) of the corporate beamformer (700) by way of a crossover (50). The third strip conductor (32*b*) is narrowed in the region of the crossover (50). A fourth strip conductor (32*c*) lies on the second (2101*s*) broad side of the first layer (210) of dielectric material, and extends from the second port (14*o*1) of the second 3 dB hybrid coupler (14) to the fourth port (42*b*) of the corporate beamformer (700) by way of the crossover (50). The fourth strip conductor (32*c*) is narrowed in the region of the crossover (50). The third (32*b*) and fourth (32*c*) strip conductors overlie each other in the crossover region (50), and cross at right angles as seen looking in a direction orthogonal to the plane of the first layer (210) of dielectric material. First (510), second (512), third (514), and fourth (516) coplanar conductors lie on the first broad side (210*us*) of the first (210) layer of dielectric, and each of the coplanar conductors (510, 512, 514, and 516) includes a tapered portion (510*t*) extending toward and into the crossover region (50). Fifth (520), sixth (522), seventh (524), and eighth (526) coplanar conductors lie on the second (2101*s*) broad side of the first layer (210) of dielectric. Each of the fifth (520), sixth (522), seventh (524), and eighth (526) coplanar conductors includes a tapered portion (corresponding to 510*t*) extending toward and into the crossover region (50). An interconnection arrangement (652, 656) is coupled to the first (510), second (512), third (514), fourth (516), fifth (520), sixth (522), seventh (524), and eighth (526) coplanar conductors, for tending to maintain the first, second, third, fourth, fifth, sixth, seventh, and eighth coplanar conductors at a common potential. Ideally, this common potential is a ground potential, and the ground potential is provided by additional conductors (632, 642, 644, 646) extending through the structure and terminating on the coplanar conductors and on a ground plane (222, 224).

A corporate beamformer (700) according to a specific aspect of the invention further includes first (222) and second (224) ground planes spaced apart from the first (32*b*) and second (32*c*) strip conductors and from the first (510), second (512), third (514), fourth (516), fifth (520), sixth (522), seventh (524), and eighth (526) coplanar conductors, for tending to constrain the fields surrounding the first (32*b*) and second (32*c*) strip conductors. This specific aspect of the invention preferably includes through-layer conductors (632, 642, 644, 646) connecting the first (222) and second (224) ground planes to the first (510), second (512), third (514), fourth (516), fifth (520), sixth (522), seventh (524), and eighth (526) coplanar conductors.

What is claimed is:

1. A beamformer, comprising:

a sheet of dielectric defining first and second broad surfaces:

a first strip conductor extending on said first broad surface of said sheet of dielectric and across a crossover region;

a second strip conductor extending on said second broad surface of said sheet of dielectric and across said crossover region, thereby tending to couple to said first strip conductor in said crossover region;

a first transition to coplanar waveguide located on said first broad surface of said sheet of dielectric and on one side of said crossover region;

a second transition to coplanar waveguide located on said first broad surface of said sheet of dielectric and on another side of said crossover region, for coacting with said first transition to coplanar waveguide so that said first strip conductor is part of a first coplanar waveguide in said crossover region;

a first transition to coplanar waveguide located on said second broad surface of said sheet of dielectric and on one side of said crossover region;

a second transition to coplanar waveguide located on said second broad surface of said sheet of dielectric and on another side of said crossover region, for coacting with said first transition to coplanar waveguide so that said second strip conductor is part of a second coplanar waveguide in said crossover region, whereby said first and second coplanar waveguides lie in different planes in said crossover region and tend to be isolated from each other.

2. A beamformer according to claim 1, further comprising:

first and second ground planes spaced away from said first and second broad surfaces of said sheet of dielectric, respectively, for coacting with said first and second strip conductors to define strip transmission line structures at least at locations remote from said crossover region; and wherein said first transition to coplanar waveguide located on said first broad surface of said sheet of dielectric, and on one side of said crossover region, comprises first and second planar conductors lying on said first broad surface of said sheet of dielectric in said crossover region, and adjacent each edge of said first strip conductor;

said second transition to coplanar waveguide located on said first broad surface of said sheet of dielectric, and on the other side of said crossover region, comprises third and fourth planar conductors lying on said first broad surface of said sheet of dielectric in said crossover region, and adjacent each edge of said first strip conductor;

said first transition to coplanar waveguide located on said second broad surface of said sheet of dielectric, and on one side of said crossover region, comprises first and second planar conductors lying on said second broad surface of said sheet of dielectric in said crossover region, and adjacent each edge of said second strip conductor; and said second transition to coplanar waveguide located on said second broad surface of said sheet of dielectric, and on the other side of said crossover region, comprises third and fourth planar conductors lying on said second broad surface of said sheet of dielectric in said crossover region, and adjacent each edge of said second strip conductor.

3. A beamformer according to claim 2, further comprising:

conductive means interconnecting said first and second ground planes with said first, second, third, and fourth planar conductors lying on said first and second broad surfaces of said sheet of dielectric, to thereby tend to maintain said first and second ground planes, and said first, second, third, and fourth planar conductors lying on said first and second broad surfaces of said sheet of dielectric, at a common electrical potential.

4. A corporate beamformer for, in one direction of operation, receiving signals to be transmitted at first and second ports, and for distributing said signals among at least third, fourth, fifth, and sixth ports, and for, in the other direction of operation, receiving signals at said third, fourth, fifth, and sixth ports, and combining said signals for generation of combined signals at said first and second ports, said beamformer comprising;

a planar structure including a first layer of dielectric material defining first and second broad sides;

a planar first 3 dB hybrid coupler lying on said first broad side of said first layer of dielectric material, said first 3 dB hybrid coupler defining common, second and third ports, said common port of said first 3 dB hybrid coupler defining said first port of said corporate beamformer;

a planar second 3 dB hybrid coupler lying on said second broad side of said first layer of dielectric material, said second 3 dB hybrid coupler defining common, second and third ports, said common port of said second 3 dB hybrid coupler defining said second port of said corporate beamformer;

a first strip conductor lying on said first broad side of said first layer of dielectric material, said first strip conductor being coupled at one end to said third port, and also being coupled at a second end to said second port of said first 3 dB hybrid coupler;

a second strip conductor lying on said second broad side of said first layer of dielectric material, said second strip conductor being coupled at one end to said second port of said second 3 dB hybrid coupler, and being coupled at a second end to said sixth port of said corporate beamformer;

a third strip conductor lying on said first broad side of said first layer of dielectric material, said third strip conductor extending from said second port of said first 3 dB hybrid coupler to said fifth port of said corporate beamformer by way of a crossover, said third strip conductor being narrowed in the region of said crossover;

a fourth strip conductor lying on said second broad side of said first layer of dielectric material, said fourth strip conductor extending from said first port of said second 3 dB hybrid coupler to said fourth port of said corporate beamformer by way of a crossover, said fourth strip conductor being narrowed in the region of said crossover, said third and fourth strip conductors overlying each other in said crossover region and crossing at right angles as seen looking in a direction orthogonal to the plane of said first layer of dielectric material;

first, second, third, and fourth coplanar conductors lying on said first broad side of said first layer of dielectric, each of said coplanar conductors including a tapered portion extending toward and into said crossover region;

fifth, sixth, seventh, and eighth coplanar conductors lying on said second broad side of said first layer of dielectric, each of said coplanar conductors including a tapered portion extending toward and into said crossover region; and interconnecting means coupled to said first, second, third, fourth, fifth, sixth, seventh, and eighth coplanar conductors, for tending to maintain said first, second, third, fourth, fifth, sixth, seventh, and eighth coplanar conductors at a common potential.

5. A corporate beamformer according to claim 4, further comprising;

first and second ground planes spaced apart from said first and second strip conductors and from said first, second, third, fourth, fifth, sixth, seventh, and eighth coplanar conductors, for tending to constrain the fields surrounding said first and second strip conductors.

6. A corporate beamformer according to claim 5, further comprising through-layer conductors connecting said first and second ground planes to said first, second, third, fourth, fifth, sixth, seventh, and eighth coplanar conductors.

* * * * *